(12) United States Patent
Zettler et al.

(10) Patent No.: US 8,514,408 B2
(45) Date of Patent: Aug. 20, 2013

(54) METHOD AND APPARATUS FOR REAL-TIME DETERMINATION OF CURVATURE AND AZIMUTHAL ASYMMETRY OF A SURFACE

(75) Inventors: Joerg-Thomas Zettler, Berlin (DE); Tobias Schenk, Berlin (DE)

(73) Assignee: Laytec Aktiengesellschaft, Berlin (DE)

( * ) Notice: Subject to any disclaimer, the term of this patent is extended or adjusted under 35 U.S.C. 154(b) by 387 days.

(21) Appl. No.: 12/882,689

(22) Filed: Sep. 15, 2010

(65) Prior Publication Data
US 2011/0063625 A1    Mar. 17, 2011

(30) Foreign Application Priority Data

Sep. 17, 2009  (DE) .......................... 10 2009 029 561
Feb. 8, 2010   (EP) ...................................... 10152969

(51) Int. Cl.
*G01B 11/30* (2006.01)
(52) U.S. Cl.
USPC ........................................................ 356/612
(58) Field of Classification Search
USPC ............ 356/3, 364, 565, 601, 623, 138, 622,
356/445, 625, 628, 636, 22, 448, 239, 237,
356/612, 613, 606, 453, 365, 487
See application file for complete search history.

(56) References Cited

U.S. PATENT DOCUMENTS

| 7,505,150 | B2 | 3/2009 | Zettler et al. |
| 7,751,046 | B2 * | 7/2010 | Levy et al. ..................... 356/401 |
| 8,014,069 | B2 * | 9/2011 | Spilman et al. .......... 359/489.01 |
| 2008/0186512 | A1 * | 8/2008 | Kee et al. ...................... 356/610 |

* cited by examiner

*Primary Examiner* — Tarifur Chowdhury
*Assistant Examiner* — Sunghee Y Gray
(74) *Attorney, Agent, or Firm* — Novak Druce Connolly Bove + Quigg LLP (57) ABSTRACT

An apparatus for measuring a curvature of a surface (1), comprising means for irradiating a first light beam (S1), a second light beam (S2) and a third light beam (S3) onto a surface (1) of a sample (12), a detector (5) comprising at least one detector plane and being adapted to detect a first position of the reflected first light beam (S1), a second position of the reflected second light beam (S2) and a third position of the reflected third light beam (S3) in the at least one detector plane, means for determining a first distance between the first position of the first light beam (S1) and the third position of the third light beam (S3) and a second distance between the second position of the second light beam (S2) and the third position of the third light beam (S3), and means for determining a mean curvature of the surface from the first distance and the second distance. The first light beam (S1), the second light beam (S2) and the third light beam (S3) are parallel to each other and the first light beam (S1) is spaced apart from a plane defined be the second light beam (S2) and the third light beam (S3).

13 Claims, 7 Drawing Sheets

METHOD AND APPARATUS FOR REAL-TIME DETERMINATION OF CURVATURE AND AZIMUTHAL ASYMMETRY OF A SURFACE

CROSS-REFERENCE TO RELATED APPLICATIONS

This application claims priority to German Patent Application 102009029561.5, filed Sep. 17, 2009 and European Patent Application 10152696.1, filed Feb. 8, 2010 the entire contents of which are incorporated herein by reference.

BACKGROUND OF THE INVENTION

1. Field of the Invention

The present invention relates to a method and an apparatus for determining mean curvature of a rotating sample as well as curvature variations as a function of the rotation angle of the sample. These samples typically are semiconductor wafers with epitaxial layers grown on their surface and the apparatus is intended to be applied during the epitaxial layer deposition.

2. Description of Related Art

During epitaxial growth of semiconductor wafers the growth processes have to be monitored in dependence of different parameters as, for example, the growing layer thickness, the temperature, the doping concentration, or the smoothness of the wafer surface. Among others, an accurate measurement of the curvature of the wafer is necessary because it correlates directly with the strain in the growing layers and indirectly with the composition of these layers. In particular during epitaxial thin-film growth on wafers in multi wafer reactors it is necessary to determine permanently the curvature of the wafer as exactly as possible in the shortest possible time.

From U.S. Pat. No. 7,505,150 a device is known for the measurement of the curvature of a surface, in which a light beam is split into two parallel light beams of equal intensity by means of a birefringent element, and a two-dimensional detector is employed for determining the curvature of the surface, which is derived from the distance between the positions of the two light spots reflected at the surface to be measured and detected on the detector plane.

Figure 1:
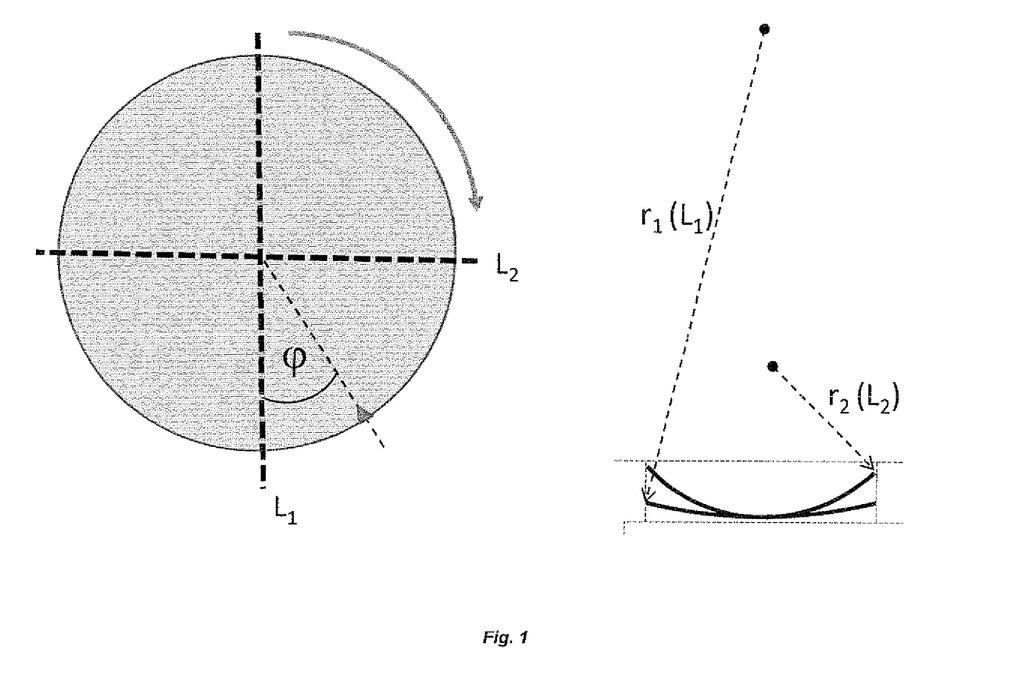
FIG. 1 shows an exemplary rotating, circular sample exhibiting different curvature radii $r_1$ and $r_2$ along two cross-section lines $L_1$ and $L_2$ having different azimuthal angles $\phi$ with respect to a given fixed reference line through the centre of the sample.
Figure 2:
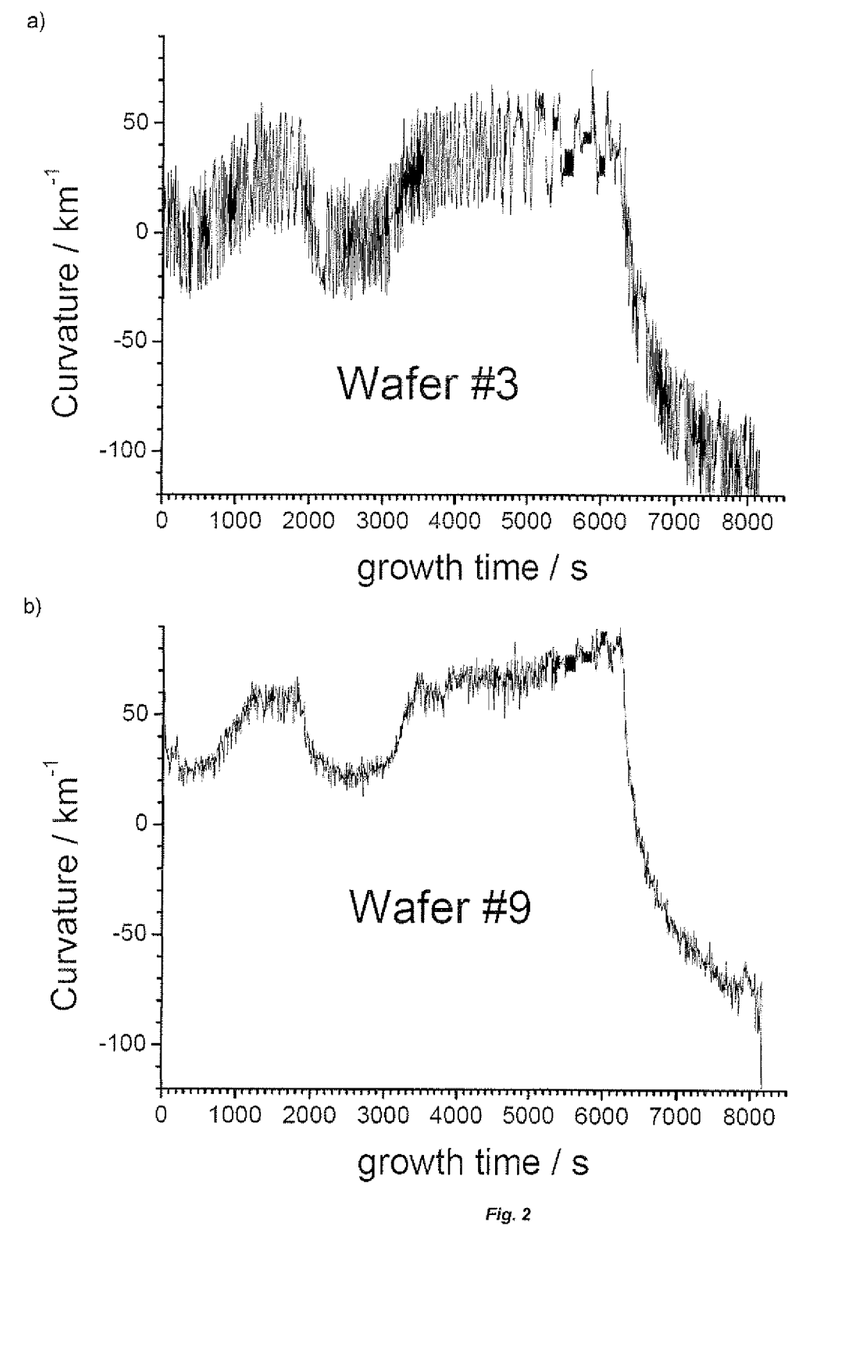
FIG. 2 shows two exemplary signal curves as obtained by conventionally measuring a curvature of two rotating samples having the same mean curvature but different azimuthal/rotational asymmetry.

However, when determining the curvature of a rotating semiconductor wafer in a reactor during epitaxial growth, problems arise, due to the fact that real wafers are usually not uniformly bent, but the curvature may vary with the rotation angle, as depicted in FIG. 1, thereby leading to unwanted fluctuations in the curvature measurements. By way of example, FIG. 2 shows two signal curves measured for two samples having the same mean curvature. However, the noise/signal ratio is much higher in FIG. 2(a) than in FIG. 2(b) due to the greater rotational asymmetry of sample (a), which causes signal fluctuations between a maximum value (corresponding to $L_2$ of FIG. 1) and a minimum value (corresponding to $L_1$ of FIG. 1). Moreover, if the epitaxial process is not adequately controlled, defects may be generated and relaxation processes may occur in the semiconductor wafers during fabrication, which according to their symmetry may further modify the rotational asymmetry of the sample.

In particular, in the industrial production of white and blue light-emitting diodes (LEDs) on sapphire substrates, the measurement of the wafer curvature during the epitaxial growth has become a standard procedure, which is aimed to keep the curvature as small as possible by controlling the process in response to the measured curvature. In this way, it is possible to compensate for a uniform bending of the wafers, but not for an asymmetrical bending, which represents one of the principal causes reducing the rate of yield.

It is therefore an object of the present invention to provide a method and an apparatus for a real-time determination of the curvature of a rotating sample with a higher accuracy in comparison to the prior art. In particular, a high noise/signal ratio of the measured signal due to a rotating sample having an azimuthal asymmetry of the curvature shall be effectively suppressed.

It is a further object of the present invention to effectively determine a film relaxation of the sample and/or the formation of defects on the sample, thus providing important parameters for controlling the fabrication process.

SUMMARY OF THE INVENTION

Aspects of exemplary embodiments of the present invention are directed to an apparatus for measuring a curvature of a surface, comprising means for irradiating a first light beam, a second light beam and a third light beam onto a surface of a sample, a detector comprising at least one detector plane and being adapted to detect a first position of the reflected first light beam, a second position of the reflected second light beam and a third position of the reflected third light beam in the at least one detector plane, means for determining a first distance between the first position of the first light beam and the third position of the third light beam and a second distance between the second position of the second light beam and the third position of the third light beam, and means for determining a mean curvature of the surface from the first distance and the second distance. The first light beam, the second light beam and the third light beam are parallel to each other and the first light beam is spaced apart from a plane defined be the second light beam and the third light beam.

Accordingly it is possible to perform a real-time determination of a mean curvature measured along two different axes of the sample which significantly reduces the noise influence. In a preferred embodiment it is possible to perform said real-time determination of a mean curvature for a plurality of points in time and therefore—with a rotating sample—for a plurality of azimuthal angles of the two axes. From the plurality of determined mean curvatures it is then possible to determine a mean curvature averaged over the whole 360° angle of the rotating sample.

In the sense of the present invention, the first, second and third positions are understood as the positions of the centre of the spots, where the reflected first light beam, the reflected second light beam and the reflected third light beam, respectively, hit the detector plane.

Preferably, the apparatus further comprises means for determining a maximum deviation from the determined (averaged) mean curvature. It was found that a film relaxation of the sample and/or the formation of defects on the sample can be effectively detected by determining a maximum deviation (for a single measurement along two axes or for a plurality of measurement for different azimuthal angles of the two axes) of the determined curvature values from the determined mean curvature. Accordingly it is possible to detect more efficiently the formation of defects and/or film relaxation of the sample which allows enhanced process control.

Preferably, the apparatus further comprises means adapted to control fabrication process parameters for the sample according to the determined mean curvature and/or according to the determined maximum deviation from the mean curvature.

Preferably, the means for irradiating the first, second and third light beams comprises a light source for irradiating a single light beam, a first birefringent element arranged between the light source and the surface of the sample such that the light beam of the light source passes through the first birefringent element and oriented with respect to the light beam of the light source such that the light beam is split up into at least a first partial beam and an intermediate partial beam, and a second birefringent element arranged between the first birefringent element and the surface of the sample such that only the intermediate partial beam passes through the second birefringent element and oriented with respect to the first birefringent element such that the intermediate partial beam is further split up into a second partial beam and a third partial beam. Preferably, the first light beam, the second light beam and the third light beam are parallel, have substantially the same intensity and their cross-section pattern forms a rectangular triangle.

Preferably, the sample comprises a diameter ranging between 50-150 mm. Preferably, the distance between the light beams before reflection at the sample surface ranges between 0.5 and 5 mm.

Preferably, the means for irradiating the first, second and third light beams is positioned such to irradiate the first light beam, the second light beam and the third light beam onto the surface of the sample along an axis having an angle of equal to or less than 10° with respect to the surface normal of the sample. More preferably, the means for irradiating the first, second and third light beams is positioned such to irradiate the first light beam, the second light beam and the third light beam perpendicularly to the surface of the sample.

Preferably, the projections of the minimum distances between the first light beam, the second light beam and the third light beam onto a plane having a normal vector parallel to the first, second and third light beams form a right-angled triangle.

Preferably, the means for irradiating the first, second and third light beams is positioned such to irradiate one of the first, second and third light beams onto the centre of the surface of the sample. Accordingly, the mean curvature is averaged over the azimuth of the centre of the sample surface. Alternatively it is also possible to determine a mean curvature being averaged over the azimuth for a portion of the sample being different to the centre of the sample. Alternatively, it is also possible to determine the respective curvature with even higher accuracy by averaging over all samples in a multi-wafer reactor.

According to another preferred embodiment it is possible to radially scan the incident light beams from the centre to the periphery of the sample surface, and—beneath determining a mean curvature which is averaged over the azimuth—to further determine a mean curvature which is averaged over the radius and over the azimuth of the sample. In this aspect it is furthermore preferred to determine a maximum deviation from the determined mean curvature for different radii and to use these data for process control.

Further aspects of exemplary embodiments of the present invention are directed to a method for measuring a curvature of a surface. The method comprises the steps of irradiating a first light beam, a second light beam and a third light beam onto a surface of a sample, wherein the first light beam, the second light beam and the third light beam are parallel to each other and the first light beam is spaced apart from a plane defined be the second light beam and the third light beam, detecting—by a detector comprising at least one detector plane—a first position of the reflected first light beam, a second position of the reflected light second beam and a third position of the reflected third light beam in the at least one detector plane, determining a first distance between the first position of the first light beam and the third position of the third light beam and determining a second distance between the second position of the second light beam and the third position of the third light beam, and determining a mean curvature of the surface from the first distance and the second distance.

Preferably, the method further comprises the step of determining a maximum deviation from the determined mean curvature of the sample surface based on the determined first distance and the determined second distance.

Preferably, the method further comprises the step of controlling fabrication process parameters for the sample according to the determined mean curvature and/or according to the determined maximum deviation from the mean curvature.

Preferably, the projections of the initial distances between the first light beam, the second light beam and the third light beam onto a plane having a normal vector parallel to the first, second and third light beams form a right-angled triangle.

Preferably, the first, second and third light beams have the same intensity and/or the first, second and third light beams are irradiated along an axis having an angle of equal to or less than 10° with respect to the surface normal of the sample. More preferably, the first, second and third light beams are irradiated perpendicularly to the surface of the sample.

Preferably, the sample has a circular shape and one of the first, second and third light beams is irradiated onto the centre of the sample.

Moreover, the sample may be a rotating sample and the first distance and the second distance may be measured with a sampling speed corresponding between 4 to 20 times the rotation speed of the sample.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 3:
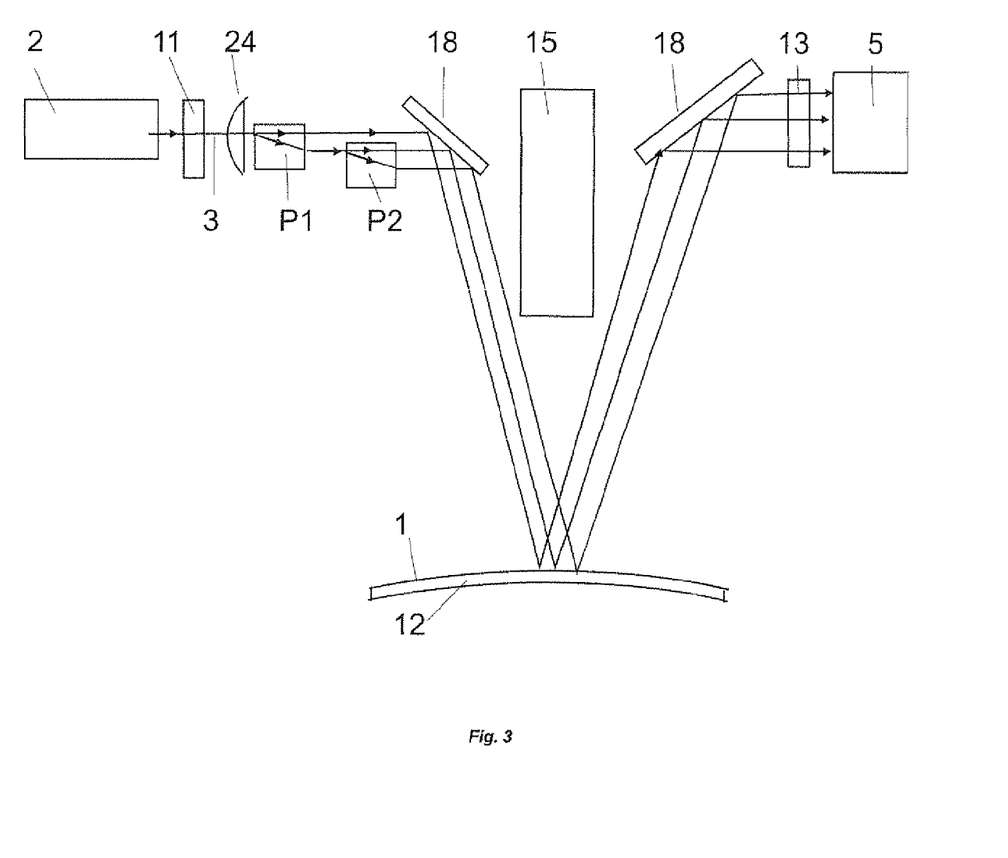
FIG. 3 is a schematic section of an apparatus for the measurement of the curvature of a sample surface for non-normal incidence of the light beams according to an aspect of the present invention.
Figure 4:
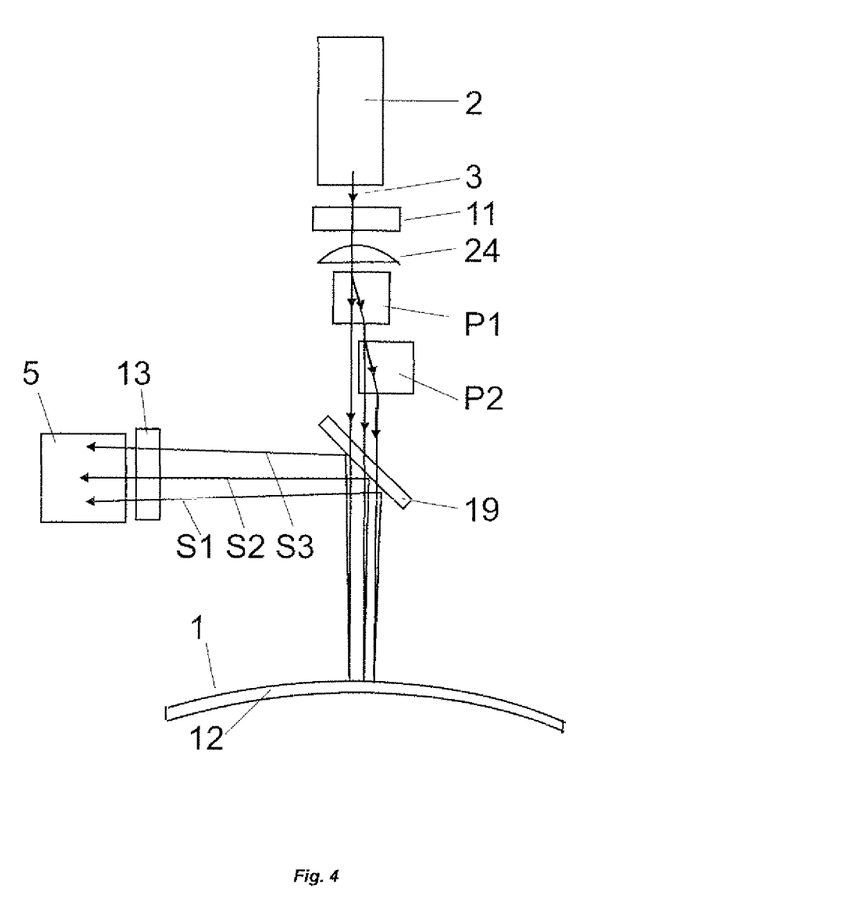
FIG. 4 is a schematic section of an apparatus for the measurement of the curvature of a sample surface for perpendicular incidence of the light beams according to another aspect of the present invention.

FIG. 3 shows a schematic section of an apparatus according to the invention for the measurement of the curvature of a sample surface 1 for non-normal incidence of the light beams S1, S2 and S3. The skew incidence may for example be necessary because the space straight above the sample surface 1 may be occupied by a device for the determination of characteristic layer parameter, for example a reflection analysis unit 15. Alternatively, FIG. 4 shows a schematic section of a device according to another embodiment of the invention for the measurement of the curvature of a sample surface for perpendicular incidence of the light beams S1, S2 and S3.

In the following, the apparatus depicted in FIG. 3 will be described. A semiconductor laser 2 generates a light beam 3, which is firstly guided through a filter 11 and a lens 24 into a first birefringent element P1. The main axis (respectively one of the main axes) of the first birefringent element P1 is oriented with respect to the light beam 3 in such a way that the light beam 3 is split up into two partial beams, hereafter addressed to as first light beam S1 and intermediate beam S', whereas after leaving the first birefringent element P1 the partial beams S1 and S' are guided in a parallel way. The intermediate beam S' leaving the first birefringent element P1 is then guided into a second birefringent element P2. The main axis (respectively one of the main axes) of the second birefringent element P2 is oriented with respect to the main axis of the first birefringent element P1 in such a way that the intermediate beam S' is further split up into two partial beams, hereafter addressed to as second and third light beams S2 and S3, whereas the first light beam S1, the second light beam S2 and the third light beam S3 are guided in a parallel way.

The first and second birefringent elements P1 and P2 preferably comprise planar faces for light-entrance and -exit. Furthermore the main axis of the first birefringent element P1 is oriented with respect to the incident light beam 3 (taking into account the polarisation of the light beam 3) and the main axis of the second birefringent element P2 is oriented with respect to the first birefringent element P1 in such a way, that the first light beam S1, the second light beam S2 and the third light beam S3 have the same or nearly the same intensity. Accordingly a cheap detector 5 with a limited dynamic range can be used, as the first, second and third light beams S1, S2 and S3 which have to be detected at the detector 5 have approximately the same intensity. Preferably, by using a pulsed light-source with the pulse-length adjustable to the reflectance of the sample, the time-averaged intensity of all three light beams can be kept within the limited dynamic range of detector 5 even for changing reflectance of surface 1. By means of a first tilted mirror 18 the first, second and third light beams S1, S2 and S3 are guided onto the sample surface 1, at which they are at least partially reflected and thereafter guided to the detector 5, which can for example be designed as a CCD-array, by a second tilted mirror 18 and a filter 13. The filter 11 serves for the suppression of unwanted emissions of the light source 2 and the filter 13 serves for the suppression of the thermal radiation of the sample 12.

Figure 5:
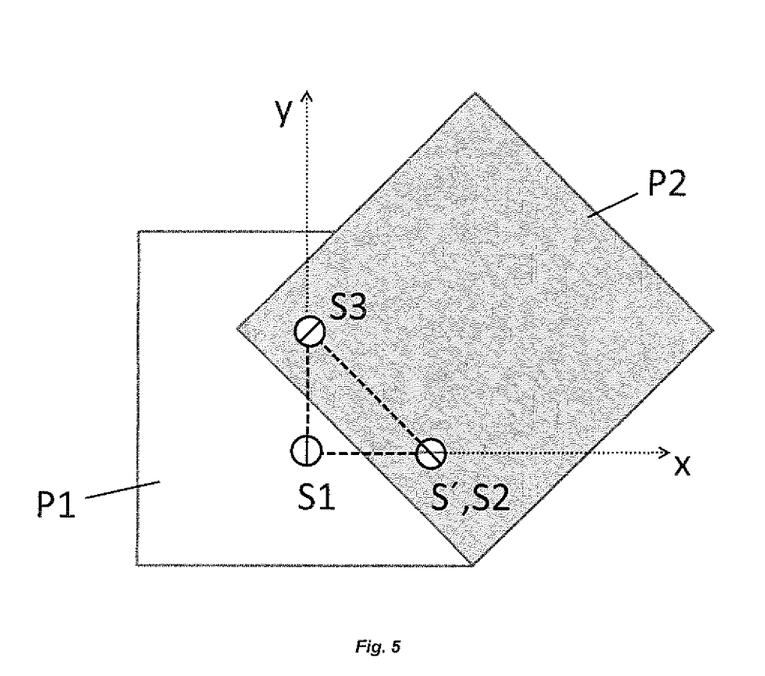
FIG. 5 is a schematic sketch (front-view to the optical elements) of a first birefringent element, a second birefringent element and the cross-section patterns and polarization directions of the resulting three beams according to an aspect of the present invention.

FIG. 5 shows a schematic section of the first birefringent element P1 and the second birefringent element P2, according to an exemplary embodiment of the present invention. The light beam emitted from the light source enters the first birefringent element P1 perpendicularly and is split up in two partial beams S1 and S'—the ordinary partial beam and the extraordinary partial beam—by the first birefringent element P1. The distance between the ordinary and extraordinary partial beams after leaving the first birefringent element P1 is determined by the thickness (and the material) of the first birefringent element P1. By way of example, the first birefringent element P1 may have a length of 27.7 mm corresponding to a distance of 3.0 mm between the partial beams. One of the two partial beams S" leaving the first birefringent element P1 is further split up in two parallel partial beams S2 and S3 by the second birefringent element P2, while the other one of the two partial beams, hereafter addressed to as the first light beam S1 leaving the first birefringent element P1 is not passing through the second birefringent element P2. After leaving the second birefringent element P2, the second light beam S2 and the third light beam S3 are parallel to the first light beam S1 exiting from the first birefringent element P1. In FIG. 5 the second birefringent element P2 is oriented with a tilt angle of 45° with respect to the first birefringent element P1, so that the direction of the first light beam S1 does not lie on the plane generated by the directions of the second and third light beams S2 and S3. Furthermore, a length of 38.8 mm may be chosen for the second birefringent element P2, which results in a distance of 4.2 mm between the second light beam S2 and the third light beam S3 emitted by the second birefringent element P2, which corresponds to the hypotenuse of a right triangle, having the other two sides corresponding to the distance between the first and second light beams and to the distance between the first and third light beams, respectively (both 3.0 mm in the example illustrated in FIG. 5). In this case, the projections of the initial (after leaving P1, P2) distances between the first light beam S1, the second light beam S2 and the third light beam S3 may form a right-angled triangle. The first and second birefringent elements P1 and P2 may have a section area of 8 mm×8 mm and an overall length of 66.5 mm.

The first, second and third light beams S1, S2 and S3 are then irradiated onto the sample surface 1 and reflected toward a detector plane of the detector 5. The detector 5 registers the positions of the spots (i.e. the centre of the spots) where the reflected first, second and third light beams S1, S2 and S3 hit the detector plane. From these positions a first distance d1 between the reflected first light beam S1 and the reflected second light beam S2 and a second distance d2 between the reflected first light beam S1 and the reflected third light beam S3 can be calculated.

In case the sample surface 1 exhibits a convex shape, the first distance d1 and the second distance d2 at the detector 5 will be larger than the corresponding initial distances before hitting the sample surface 1. On the contrary, the first distance d1 and the second distance d2 at the detector 5 will be smaller than the corresponding initial distance if the sample surface 1 has a concave shape. Via the known parameters (distance between the light beams at the sample surface 1, distance between the reflected light beams at the detector 5 and distances and angles of the sample surface 1 with respect to the mirror 18 and to the detector 5) a curvature value $C_x$ for the first distance d1 (extending along an axis from S1 to S2) and a curvature value $C_y$ for the second distance d2 (extending along a perpendicular axis from S1 to S3) can be calculated, which preferably is carried out by a device for data processing (not shown).

In particular, the measurement of a first distance d1 and a second distance d2 allows obtaining two curvature values along two different azimuthal axes—i.e. for two different values of the azimuthal angle φ—at the same time. A mean value $C_{mean}$ may therefore be obtained at any time by averaging over the two values $C_x$ and $C_y$. Since the asymmetrical component of the curvature varies with the rotation angle φ with a period of 180°, if the distances between the light beams at the sample surface 1—corresponding to first and second distances on the detector plane—are set perpendicularly to each other, the fluctuations of the asymmetrical component in $C_x$ and $C_y$, which are shifted of a 90° angle, will compensate.

Figure 6:
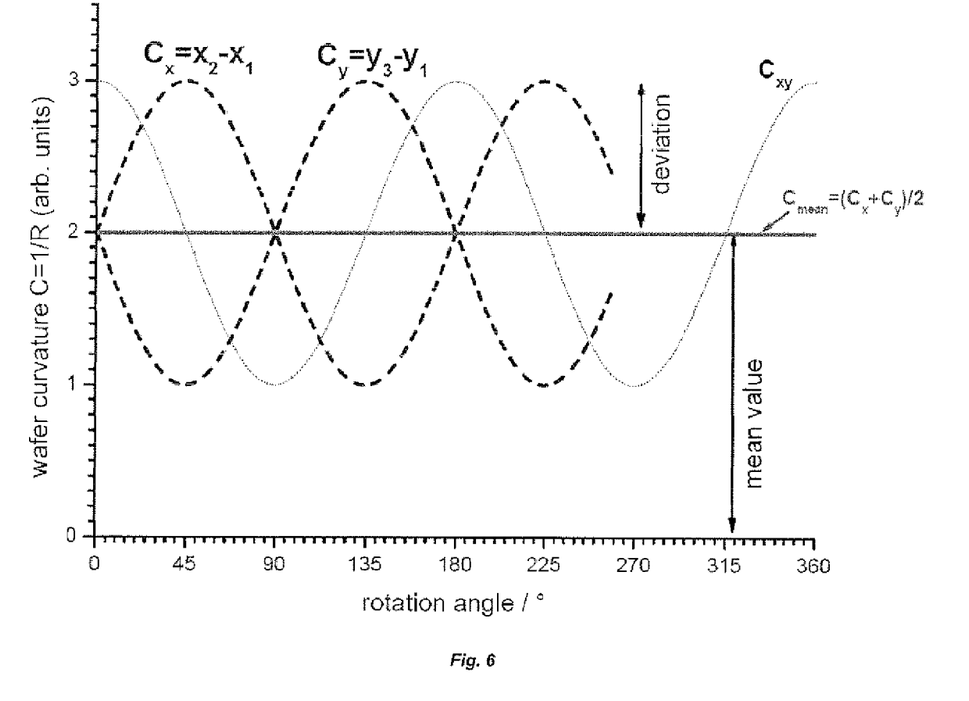
FIG. 6 shows the variations of the two components of the curvature measured during a 360° rotation of the sample.

FIG. 6 shows the two components of the curvature $C_x$ and $C_y$ measured during a 360° rotation of the sample. $C_x$ and $C_y$ are calculated from the first distance d1 between the first and second beam (x-component) and from the second distance d2 between the first and third beam (y-component), respectively, and they behave like harmonic oscillations shifted of a 90° angle with respect to one another. A mean curvature value can be calculated at any measuring time as $C_{mean}=(C_x+C_y)/2$, while the maximum deviation from the mean curvature due to azimuthal asymmetrical fluctuations can be obtained analyzing the values of the x and y components during a 360° rotation of the sample or by analysing $C_{xy}=|(x_2,y_2)-(x_3,y_3)|$ with respect to $C_x$ and $C_y$.

Figure 7:
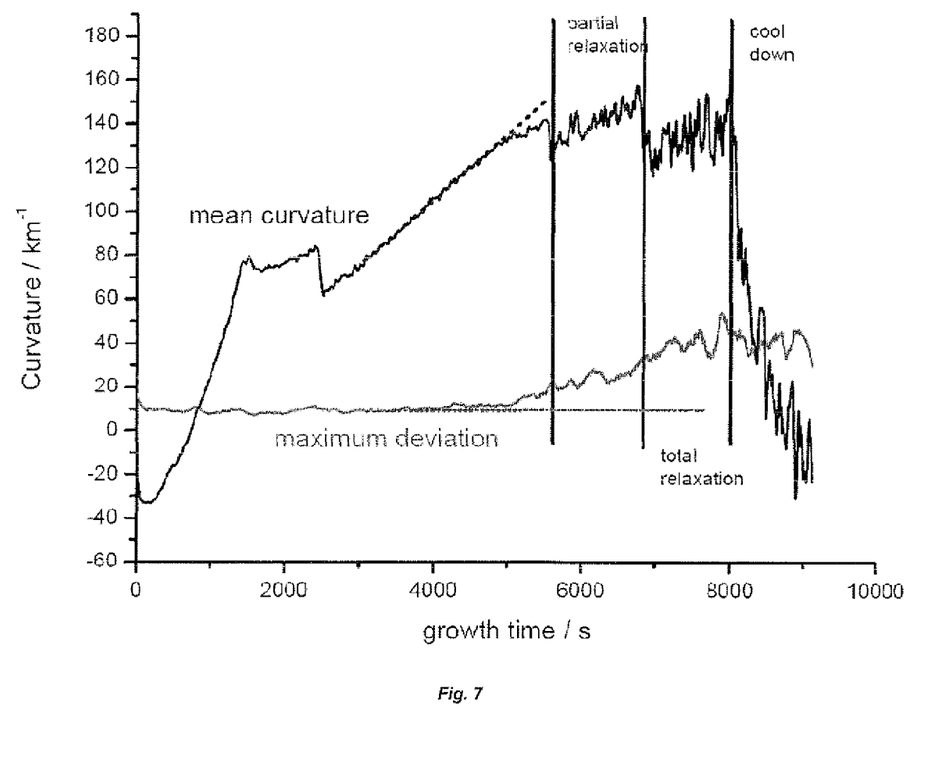
FIG. 7 shows characteristic curves for the mean curvature and for the maximum deviation from the mean curvature measured during epitaxial growth of AlGaN on a GaN/Sapphire sample according to the method of the present invention.

FIG. 7 shows characteristic curves for the mean curvature and for the maximum deviation from the mean curvature measured during epitaxial growth of AlGaN on a GaN/Sapphire sample according to the method of the present invention. Since the azimuthal-symmetrical (mean curvature) and azimuthal-asymmetrical (maximum deviation from the mean curvature) components of the curvature are separated, we can clearly see at about 5000 s that the asymmetrical component of curvature increases during growth of films with high tensile stress, thus hinting at the formation of defects and representing an early warning signal for later film relaxation. Surprisingly it was found that this asymmetric component of curvature does not show any correlation with composition of the growing films, in contrast to the symmetrical component of the curvature. Therefore, the increasing "maximum deviation" at 5000 s in FIG. 7 clearly indicates defect generation while the reduced slope of "mean curvature" at 5000 s could be due either to composition changes or to defect generation. Hence, only the "maximum deviation" component of curvature signal is a good early warning signal for subsequent strain-induced film relaxation.

The main idea of the invention is to provide a method and an apparatus for determining the curvature of a rotating sample in real time (during fabrication processes) with a high signal-to-noise ratio and to separate the azimuthal asymmetric component in the curvature from the mean curvature value by irradiating the sample surface with three parallel light beams arranged in an ortho-triangular pattern.

The determination of the mean curvature is an important parameter for controlling the fabrication process, thus to minimize the bending of the sample surface. Moreover, the determination of the asymmetrical fluctuations provides essential information for preventing the formation of defects and film relaxation during epitaxial growth.

Reference Sign List
1 surface
2 light source
3 light beam
5 detector
11 filter
12 sample
13 filter
15 reflection-analysis unit
18 tilted mirror
19 partially transmitting mirror
24 lens
P1 first birefringent element
P2 second birefringent element
S' intermediate beam
S1 first light beam
S2 second light beam
S3 third light beam
φ rotation angle/azimuthal angle

What is claimed is:

1. An apparatus for measurement of a curvature of a surface (1), comprising:
   means adapted for irradiating a first light beam (S1), a second light beam (S2) and a third light beam (S3) onto a surface (1) of a sample (12), wherein the first light beam (S1), the second light beam (S2) and the third light beam (S3) are parallel to each other and the first light beam (S1) is spaced apart from a plane defined be the second light beam (S2) and the third light beam (S3);
   a detector (5) comprising at least one detector plane and being adapted to detect a first position of the reflected first light beam (S1) in the at least one detector plane, a second position of the reflected second light beam (S2) in the at least one detector plane and a third position of the reflected third light beam (S3) in the at least one detector plane;
   means adapted to determine a first distance between the first position of the first light beam (S1) and the third position of the third light beam (S3) and adapted to determine a second distance between the second position of the second light beam (S2) and the third position of the third light beam (S3);
   means adapted to determine a mean curvature of the surface (1) from the first distance and the second distance, and
   means adapted to determine a maximum azimuthal curvature deviation from the determined mean curvature.

2. The apparatus of claim 1, further comprising means adapted to control fabrication process parameters for the sample (12) according to the determined mean curvature and/or according to the determined maximum azimuthal curvature deviation from the mean curvature.

3. The apparatus of claim 1, wherein the means for irradiating the first light beam (S1), the second light beam (S2) and the third light beam (S3) comprises:
   a light source (2) for irradiation of an initial polarized, unpolarized or partially polarized single light beam (3),
   a first birefringent element (P1) and a second birefringent element (P2) arranged between the light source (2) and the surface (1) of the sample (12) such that the light beam (3) of the light source (2) passes through the first birefringent element (P1),
   wherein the main axis of the first birefringent element (P1) is oriented with respect to the light beam (3) of the light source (2) such that the light beam (3) is split up into at least a first partial beam (S1) and an intermediate partial beam (S'), and
   wherein the second birefringent element (P2) is arranged such that only the intermediate partial beam (S') passes through the second birefringent element (P2),
   wherein the main axis of the second birefringent element (P2) is oriented with respect to the first birefringent element (P1) such that the intermediate partial beam (S') is further split up into a second partial beam (S2) and a third partial beam (S3).

4. The apparatus of claim 3, wherein the first light beam (S1), the second light beam (S2) and the third light beam (S3) have substantially the same intensity.

5. The apparatus of claim 4, wherein the means for irradiating the first, second and third light beams (S1, S2, S3) is positioned such to irradiate the first light beam (S1), the second light beam (S2) and the third light beam (S3) along an axis having an angle of equal to or less than 10° with respect to the surface normal of the sample (12).

6. The apparatus of claim 5, wherein the projections of the minimum distances between the first light beam (S1), the second light beam (S2) and the third light beam (S3) onto a plane having a normal vector parallel to the first, second and third light beams (S1, S2, S3) form a right-angled triangle.

7. The apparatus of claim 6, wherein the means for irradiating the first, second and third light beams (S1, S2, S3) is positioned such to irradiate one of the first, second and third light beams (S1, S2, S3) onto the centre of the surface (1) of the sample (12).

8. A method for measurement of a curvature of a surface (1), comprising:
  irradiating a first light beam (S1), a second light beam (S2) and a third light beam (S3) onto a surface (1) of a sample (12), wherein the first light beam (S1), the second light beam (S2) and the third light beam (S3) are parallel to each other and the first light beam (S1) is spaced apart from a plane defined be the second light beam (S2) and the third light beam (S3);
  detecting, by a detector (5) comprising at least one detector plane, a first position of the reflected first light beam (S1) in the at least one detector plane, a second position of the reflected light second beam (S2) in the at least one detector plane and a third position of the reflected third light beam (S3) in the at least one detector plane;
  determining a first distance between the first position of the first light beam (S1) and the third position of the third light beam (S3) and determining a second distance between the second position of the second light beam (S2) and the third position of the third light beam (S3);
  determining a mean curvature of the surface (1) from the first distance and the second distance; and
  determining a maximum azimuthal curvature deviation from the determined mean curvature of the sample surface (1) based on the determined first distance and the determined second distance.

9. The method of claim 8, further comprising the step of controlling fabrication process parameters for the sample (12) according to the determined mean curvature and/or according to the determined maximum azimuthal curvature deviation from the mean curvature.

10. The method of claim 8, wherein the projections of the minimum distances between the first light beam (S1), the second light beam (S2) and the third light beam (S3) onto a plane having a normal vector parallel to the first, second and third light beams (S1, S2, S3) form a right-angled triangle.

11. The method of claim 10, wherein the first, second and third light beams (51, S2, S3) have the same intensity and/or wherein the first, second and third light beams (51, S2, S3) are irradiated along an axis having an angle of equal to or less than 10° with respect to the surface normal of the sample (12).

12. The method of claim 11, wherein the sample (12) has a circular shape and one of the first, second and third light beams (51, S2, S3) is irradiated onto the centre of the sample (12).

13. The method of claim 12, wherein the sample (12) is a rotating sample and the first distance and the second distance are measured with a sampling speed which corresponds between 4 to 20 times the rotation speed of the sample (12).

* * * * *